(12) United States Patent
Howe et al.

(10) Patent No.: US 11,826,965 B2
(45) Date of Patent: Nov. 28, 2023

(54) METHOD FOR MAKING CONSOLIDATED COMPOSITE STRUCTURES

(71) Applicant: The Boeing Company, Chicago, IL (US)

(72) Inventors: Christopher A. Howe, Albert Park (AU); Angelo Koucoulis, Melbourne (AU); Stuart Bateman, Mount Waverley (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/744,386

(22) Filed: May 13, 2022

(65) Prior Publication Data
US 2022/0388255 A1 Dec. 8, 2022

Related U.S. Application Data (60) Provisional application No. 63/197,615, filed on Jun. 7, 2021.

(51) Int. Cl.
| | | |
|---|---|---|
| *B33Y 10/00* | (2015.01) | |
| *B29C 69/02* | (2006.01) | |
| *B33Y 80/00* | (2015.01) | |
| *B64C 9/24* | (2006.01) | |
| *B29C 70/48* | (2006.01) | |
| *B29K 307/04* | (2006.01) | |
| *B29K 309/08* | (2006.01) | |
| *B29L 31/30* | (2006.01) | |

(52) U.S. Cl.
CPC .............. *B29C 69/02* (2013.01); *B33Y 10/00* (2014.12); *B33Y 80/00* (2014.12); *B64C 9/24* (2013.01); *B29C 70/48* (2013.01); *B29K 2307/04* (2013.01); *B29K 2309/08* (2013.01); *B29L 2031/3085* (2013.01)

(58) Field of Classification Search
None
See application file for complete search history.

(56) References Cited

U.S. PATENT DOCUMENTS

| | | | |
|---|---|---|---|
| 5,643,390 A | 7/1997 | Don et al. | |
| 6,835,436 B1 | 12/2004 | Reif et al. | |
| 8,470,404 B2 | 6/2013 | Obermeyer | |
| 2010/0121475 A1* | 5/2010 | Lyons | B29C 70/68 700/212 |
| 2016/0176085 A1* | 6/2016 | Brok | B29C 45/14418 244/119 |
| 2017/0204833 A1* | 7/2017 | Albert | B29C 70/00 |
| 2021/0023796 A1 | 1/2021 | Stawski | |

FOREIGN PATENT DOCUMENTS

WO 2015166479 A1 11/2015

OTHER PUBLICATIONS

European Search Report for EPO Patent Application No. 22158941.9, dated Jul. 20, 2022, 9 pages.

* cited by examiner

*Primary Examiner* — Mohammad M Ameen
(74) *Attorney, Agent, or Firm* — Jordan IP Law, LLC (57) ABSTRACT

Disclosed herein are methods for fabricating a composite structure by forming, via additive manufacturing, a solid-phase component; positioning the solid-phase component and a reinforcement into a mold cavity; and consolidating, in the mold cavity, the solid-phase component, the reinforcement, and a liquid-phase component to form the composite structure.

19 Claims, 11 Drawing Sheets

METHOD FOR MAKING CONSOLIDATED COMPOSITE STRUCTURES

CROSS REFERENCE TO RELATED APPLICATIONS

This U.S. Non-Provisional patent application claims benefit of priority to U.S. Provisional Patent Application No. 63/197,615 filed Jun. 7, 2021.

FIELD

The disclosure relates to fabrication of composite structures using additive manufacturing combined with resin infusion technology.

BACKGROUND

The fabrication of complex assemblies for engineered structures requires multiple materials and many process steps. For example, a leading-edge cover for an aircraft wing flap, is currently designed with reinforced plastic skins, metallic ribs, phenolic shims, and metallic fasteners. In one example, the reinforced plastic skins are fabricated with pre-impregnated fiber glass reinforcement, that is manually placed into a metallic tool of the required profile for the aerodynamic nose shape. The part is then cured at elevated temperature and pressure, in an autoclave. The metallic ribs are formed into shape using sheet forming technologies, or machined to a geometry using mill machining. Alternatively, the ribs are manufactured with pre-impregnated reinforcement, similar to the nose skin. The ribs are then loaded onto an assembly jig. The skin is fitted to the ribs, and checked for tolerance fit. In most cases, gaps are found between the ribs and skin, that need to be filled with a shim material, such phenolic film. When these gaps are addressed, holes are drilled, countersunk, deburred, and inspected to allow insertion and installation of metallic fasteners.

The drawbacks of these processes include labor intensity, manufacturing time, the number of different materials, and inconsistency between shipsets at the assembly station, that hinders meeting time goals and restricts achieving repeatable, high-rate production.

Another existing solution for manufacturing complex assemblies for engineered structures requires the fabrication of separate thermoplastic components that are welded together at an assembly station. In this case, skins and ribs are fabricated using a reinforced thermoplastic sheet. These sheets are placed over molds, and either stamped, pressed, or laid ply-ply to the required profile and set into consolidated shape at elevated temperature and applied pressures. The reinforced thermoplastic ribs are loaded into an assembly jig. The skin is fitted to the ribs and checked for tolerance fit. A resistive heating element is applied to allow for the rib and skin to be welded together locally, to create a cohesive joint. Drawbacks of this process include labor time, manufacturing time, cumbersome resistive heating process and inconsistency between shipsets at the assembly station, that hinders meeting goal times and restricts achieving repeatable, high-rate production.

To date, additive manufacturing techniques have not been suitable for use in aircraft structural applications. Limitations on the use of additive manufacturing include (i) limited scale of fabricating structural parts within a confined 3D printing chamber, (ii) the slow lead time to fabricate parts, and (iii) poor structural properties of the resulting products.

SUMMARY

In accordance with one or more examples, provided are methods for fabricating a composite structure, the method comprising: forming, via additive manufacturing, a solid-phase component comprising a polymer matrix material; positioning the solid-phase component and a reinforcement into a mold cavity; and introducing into the mold cavity a liquid-phase component comprising a material that is bond-compatible with the polymer matrix material, such that the liquid-phase component impregnates the reinforcement and bonds with the solid-phase component thereby forming the composite structure.

Disclosed herein are methods for fabricating a composite structure, the method comprising: forming, via additive manufacturing, a solid-phase component; positioning the solid-phase component and a reinforcement into a mold cavity; and consolidating, in the mold cavity under a controlled temperature and a controlled pressure, the solid-phase component, the reinforcement, and a liquid-phase component that is bond-compatible with the solid-phase component to form the composite structure.

Also disclosed are airplane aircraft wing flaps having a leading edge, the leading edge comprising the composite structure formed by methods described herein.

The features, functions, and advantages that have been discussed can be achieved independently in various examples or can be combined in yet other examples further details of which can be seen with reference to the following description and drawings.

DRAWINGS

The various advantages of the examples of the present disclosure will become apparent to on skilled in the art by reading the following specification and appended claims, and by referencing the following drawings in which:

In the figures, relative sizes as shown are arbitrary and are not meant to convey preferred dimensions or sizes.

Accordingly, it is to be understood that the examples of the disclosure herein described are merely illustrative of the application of the principles of the disclosure. Reference herein to details of the illustrated examples is not intended to limit the scope of the claims, which themselves recite those features regarded as essential to the disclosure.

DESCRIPTION

Disclosed are methods for fabrication of composite structures using a polymer matrix, where the parent matrix is introduced to the mold as two discrete phases, that is a solid and liquid. These two phases blend together during a process stage within a mold, resulting in the formation of co-infused structure of the same, similar, or compatible polymer matrix materials. The mold contains a cavity to house the solid phases, and runners and channels to allow for the liquid to flow. The cavity is also designed to house reinforcements, such as carbon and/or glass fabrics, to enable formation of a composite material.

Definitions

The term "additive manufacturing" concerns manufacturing techniques that produce an article placing material where it is desired, typically by forming a series of layers sequentially. In some examples, additive manufacturing grows three-dimensional objects by forming a series of fine layers. Each layer bonds to the preceding layer by use of melted or partially melted material. Computer-aided-design (CAD) software is typically used in additive manufacturing to create the intended design, based on profile, shape, thickness and surface texture. Ultimately, the design of the manufactured part is governed by the selected material, process and pathway to build the component. 3D printing is one example of additive manufacturing.

"3D printing" is one example of additive manufacturing where a three-dimensional object is created by laying down successive layers of material until the three-dimensional object is created. In some examples, resin is extruded though one or more nozzles, under computer control, to form one layer of the three-dimensional object. Additional layers are put down until the desired three-dimensional object is completed.

Computer-aided-design (CAD) software can be used to create designs for additive manufacturing (such as 3D printing). CAD produces a digital file that is used by the computer that controls the additive manufacture (AM) process. Use of CAD allows improved productivity, reproducibility and quality of the product produced by additive manufacturing.

As used herein, the term "composite material" refers to a material made of two or more constituent materials, such as, for example, reinforcing fibers embedded in a polymer resin matrix.

The term "bond-compatible," in the context of this disclosure, means (i) chemical bonding, attributed to intermolecular forces, where the liquid-phase component (300) has sufficient surface energy to bond to the solid-phase component (100), (ii) chemical bonding, were the solid-phase component (100), at a given temperature softens and adheres with the liquid-phase component (300), or (iii) chemical bonding, where the solid-phase component (100) transitions partially to a viscous phase, and enables a liquid-to-liquid interaction with the liquid-phase component (300).

The term "mold" refers to a hollow container where, in the instantly disclosed processes, the solid-phase component (100) and the reinforcement (200) are contacted with the liquid-phase component (300) to form the composite structure (400). Molds are useful in giving shape to the composite structure (400) when the liquid-phase component (300) hardens and consolidates with the solid-phase component (100) and the reinforcement (200).

The phrase "mold cavity" refers to the empty space within the unfilled mold cavity. The mold cavity is of a particular size and shape depending on the composite structure (400) being formulated.

The phrase "injection molding" refers to injecting the liquid-phase component (300) under pressure into the mold cavity.

The phrase "resin infusion" refers to a process where voids with a porous material and/or mold are filled with a liquid resin such as the liquid-phase component (300). In some examples, vacuum pressure assists with the infusion of the resin.

The term "skin" refers to an outer surface of an airplane.

The term "stiffener" refers to a structural support element.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

When values are expressed as approximations, by use of the antecedent "about," it will be understood that the particular value forms another example. All ranges are inclusive and combinable. In addition, when a range is recited, it is contemplated that all values within the range, including end points, are combinable in all possible combinations.

A solid-phase component (100) is fabricated using additive manufacturing, and/or machining methods, to form inserts, interfaces, structural material, or joints, where unique architectures and surface textures are readily manufactured of the parent polymer matrix.

The solid-phase component (100) comprises thermoset resins, thermoplastic resins, or mixtures thereof. Suitable thermoset resins include epoxy, polyester, acrylic phenolic vinyl ester polyamide, silicone, bis-maleimides, cyanate esters polyurethane and the like, and combinations thereof. Suitable thermoplastic resins include polyethylene terephthalate, polypropylene, polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), Polyethylenimine (PEI) (such as ULTEM™ manufactured by SABIC), polyphenylene sulfide (PPS), polyethersulfone (PES), polyvinyl Chloride (PVC), polypropylene (PP), high-density polyethylene (HDPE), and the like and combinations thereof.

The solid-phase component (100) and a reinforcement (200) are placed in a mold. The liquid-phase component (300) is introduced to the mold (see FIG. 1C) using liquid molding technologies, such as resin infusion resin transfer molding or the like techniques. The liquid is of the same, similar, or compatible material as the parent matrix. The liquid-phase component (300) fills the cavity in and around the solid inserts (solid-phase component (100) and reinforcement (200), for example). During the infusion process, the solid-phase component (100) and liquid-phase component (300) combine and bond through mechanical and/or chemical interactions to form a composite structure (400).

The reinforcement (200) comprises glass fibers or carbon fibers or both glass fibers and carbon fibers. In some examples, the glass fibers or carbon fibers are in the form of a sheet or fabric, that includes uni-directional, non-crimp, woven and braid formats.

The liquid-phase component (300) is chosen to be the same, similar, or compatible with the solid-phase component (100). Liquid-phase components (300) include thermoset resins, thermoplastic resins, or mixtures thereof. Suitable thermoset resins include epoxy, polyester, acrylic, phenolic, vinyl ester, bis-maleimides, benzoxazines, cyanate esters and polyurethane. Suitable thermoplastic resins in parent, oligomer forms and derivatives, include polyethylene terephthalate (PET), polypropylene (PP), polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), Polyethylenimine (PEI) (such as ULTEM™ manufactured by SABIC), polyphenylene sulfide (PPS), polyethersulfone (PES), polyvinyl Chloride (PVC), high-density polyethylene (HDPE), and the like, and combinations thereof. Some liquid-phase components have a viscosity of about 10 cps to about 1000 cps as determined by according to ASTM D 2196.

In some examples, to ensure that the composite structure meets structural requirements, voids and stress concentrations should be minimized. When forming composite structures, rasp angle and bead thickness are variables that can be controlled to mitigate voids, stress concentrations, and thermal mismatch. In certain examples, voids or porosity should be less than 5% by volume. In other examples, voids or porosity are preferably less than 2% by volume, or from about 0.5 to about 5%, or from about 0.5 to about 3% or from about 0.5 to about 2% by volume of the composite. In some examples, stress concentrations, such as gaps, cracks, or notches, are less than 0.25-inches in length. In certain examples, stress concentrations are less than 0.05-inches in length.

In some examples of the consolidation process, the bonding between the solid-phase component (100) and the liquid-phase component (300) is equivalent or higher than the polymer infused reinforcement out-of-plane properties for one or more of peel strength, lap-shear strength, pull-off strength and interlaminar fracture toughness. The test method(s), for each of these out-of-plane properties is dependent on the aircraft structure. For example, for a stiffener bonded to a resin infused skin, excellent pull off strength and Mode 1 Interlaminar Fracture Toughness is needed. ASTM D5528-13 is used to measure Mode 1 Interlaminar Fracture Toughness and ASTM is used to measure peel strength. ASTM D3528 is utilized to determine Lap Shear Strength. In some examples, Mode I Interlaminar properties of laminates range from 40 to 2000 J/m$^2$. Low toughness epoxies in carbon fiber laminates are at the lower end. Tough thermoplastics in carbon fiber laminates such as PEKK, at the higher end.

Control of the surface energy or tension of the surface detail of solid-phase component can be beneficial to the consolidation process and strength of the bonding of parts. The surface tension of the solid-phase can be tailored to ensure that the liquid resin wets the solid-phase.

When the solid (thermoplastic) and liquid (thermoset) form a bond, in some instances, the thermoplastic may be miscible in the thermoset. This potentially leads to the formation of an interpenetrating polymer network (IPN). For example, a polyethersulfone (PES) 3D printed part, when combined with an epoxy liquid resin, may form a IPN at the bond interface. In such constructs, the polymers are at least interlaced to some extent while not being covalently bonded to each other. Such constructs are known to have good mechanical properties.

Composite structures (400) include any structure produced by the processes described herein. In some examples, the composite structures are those used in aircraft structural applications. These structures include composite panels and parts used in wing, fuselage, and tail constructs. Some composite structure (400) are panels, fairings, covers, interfaces, shims, edges, wedges, and fittings applicable to flaps, wing, tails, and fuselage regions of the aircraft including leading edge devices include Krueger and variable chamber flaps.

The ability to combine the benefits of additive manufacturing and liquid molding to fabricate complex structural components with joints and unique 3D architectures, and to mitigate the weakness of each technology when separately applied is one advantageous feature of the methods disclosed herein. The additive manufacturing (3D printing) process allows for the fabrication of controlled unique designs at the interface and filler locations. Liquid molding enables for combining reinforcement, such glass or carbon fiber fabrics, with a polymer matrix to form complex skins and stiffeners at larger scales than a 3D printer.

In some examples, technical features of the disclosed methods include one or more of:
(i) the solid and liquid components are combined to create a structural joint or interface,
(ii) the solid-phase component (100) is of a parent polymer matrix,
(iii) the solid-phase component (100) is 3D printed and/or machined to required geometry and surface finish,
(iv) the solid-phase component (100) is readily located in the cavity of a mold,
(v) the solid-phase component (100) is combined with other constituents, such as fillers or reinforcement (200), to provide required structural, thermal, or electrical properties,
(vi) the liquid-phase component (300) is of same, similar, or compatible material as the parent polymer matrix of the solid-phase component (100),
(vii) the liquid-phase component (300) is of sufficient viscosity to fill the mold cavity,
(viii) the liquid-phase component (300) readily interacts and bonds to the solid-phase component (100), and
(ix) the liquid-phase component (300) flows, fills, and bonds to reinforcement (200) located within the mold cavity.

Processing characteristics include one or more of:
(i) the solid-phase component (100) and liquid-phase component (300) being compatible at a given temperature to enable a bond to occur,
(ii) the temperature where the solid-phase component (100) and the liquid-phase component (300) interact enables for the solid-phase component (100) to remain intact,
(iii) the temperature of the mold is sufficient to allow the liquid-phase component (300) to flow to fill the required cavity, (iv) the temperature and time cycle used in the fabrication process enable an integrated part to form, where the liquid-phase component (300) transitions to a solid form, and (v) a composite structure (400) is demolded.

Features described herein include those specific to a multi-purpose polymeric material and method to enable for a liquid and solid polymer to join within the confines of a mold. The multi-purpose polymeric materials are 3D printed, injection molded or resin infused into separate solid parts, and are combined in a mold, where the liquid-phase component (300) joins the features together.

A variety of resin infusion technologies are suitable for use. These technologies include Controlled Atmospheric Pressure Resin Infusion (CAPRI), Resin Transfer Molding, Resin Film Infusion, Vacuum Assisted Resin Transfer Molding, Vacuum Assisted Resin Bag Infusion, and Bulk Resin Infusion, can be utilized. In some examples, infusion temperature, cure temperature, and temperature ramp rate are used to control the resin viscosity to ensure compete fill of the preform, and complete wetting of the solid-phase component. In some examples, the cure temperature should not exceed the melt temperature of solid-phase component.

The bonding of components during the consolidation can be based on a chemical bond, attributed to intermolecular forces, where the liquid-phase component (300) has sufficient surface energy to bond to the solid-phase component (100). Alternately, a chemical bond is formed, were the solid-phase component (100), at a given temperature softens and adheres with the liquid-phase component (300). Or, a chemical bond is formed, where the solid-phase component (100) transitions partially to a viscous phase, and enables a liquid-to-liquid interaction with the liquid-phase component (300). Temperatures used for the bond to occur will be dependent on the infusion and cure cycle that set for the infusion resin. Typically for an epoxy resin, infusion occurs in the range from 60° C. to 160° C., and curing is carried out from 160° C. to 200° C.

During the resin infusion process, the resin first wets the solid-phase component during the infusion phase. The infusion phase is dependent on the viscosity of the resin to ensure complete filling of the reinforcement and wetting of the AM detail. In some examples, for an epoxy resin, this infusion temperature is selected from range of about 60° C. to about 160° C. The intermolecular attraction or interaction between the liquid and solid phase will then occur between the infusion and cure temperature. Once the degree of cure (DoC) of the resin exceeds about 90%, an effective bond will take place.

The benefits of the disclosed fabrication methods include:
(i) manufacture of unique architectures, such as noodles, core, channels using 3D printing, and then be combined with large scale regions, where these large-scale regions are manufactured in rapid cycle times,
(ii) minimization of number of materials needed to fabricate complex assemblies for engineered structures,
(iii) reduction in the use of assembly aids, fasteners, shims and/or adhesives, and
(iv) equivalent material properties across regions of a 3D architecture.

Figure 1A:
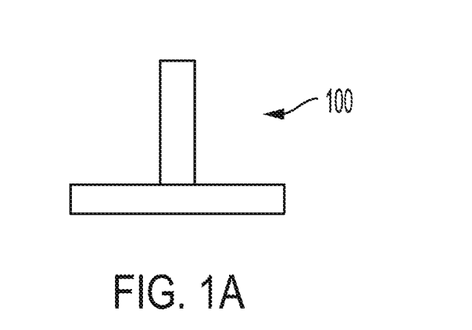
FIG. 1A illustrates a solid-phase component, such as a solid stiffener, that is produced by a 3-D printer.
Figure 1B:
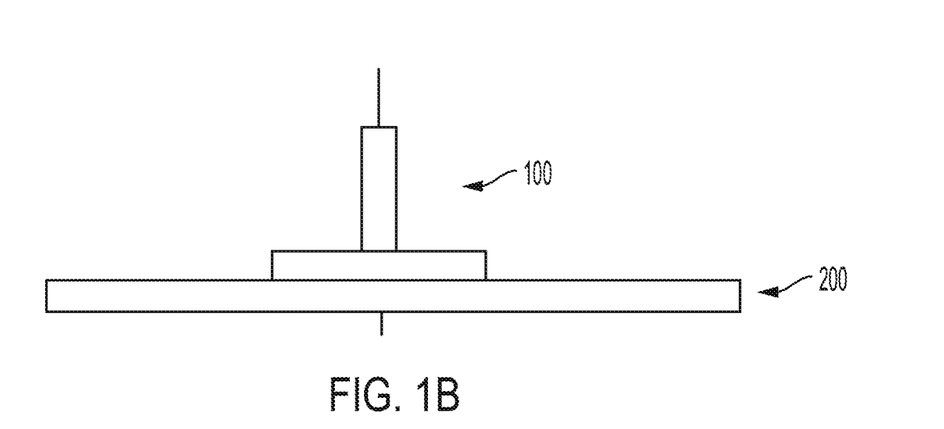
FIG. 1B illustrates contacting the solid stiffener with a preform structure, such as a reinforcement, which is loaded into a mold cavity.
Figure 1C:
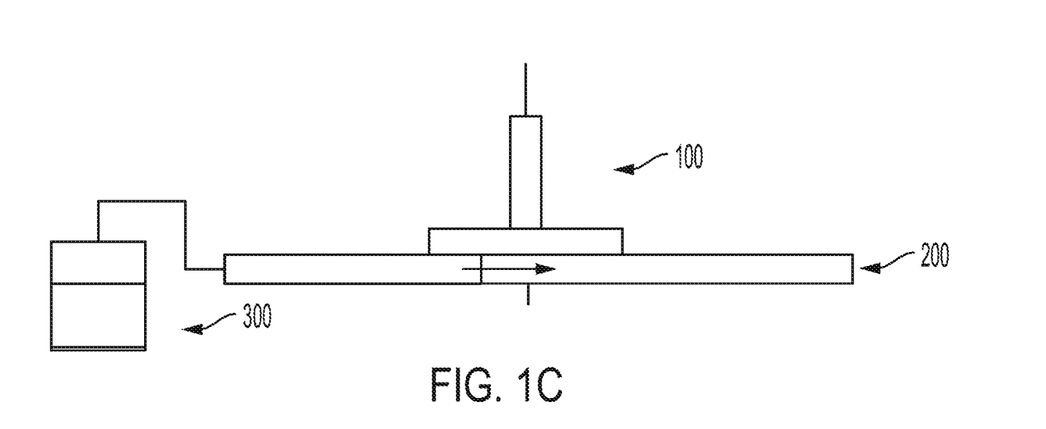
FIG. 1C illustrates flowing a liquid-phase component, such as a liquid resin, into the mold cavity to consolidate the part. The liquid-phase component fills voids in the reinforcement and bond the reinforcement to the solid-phase component.

One process flow for fabrication of a complex assembly, combining solid and liquid components in a mold, is shown in FIGS. 1A-1C. A solid-phase component (100) (such as a stiffening element) is combined with a reinforcement (200) (such as a composite reinforced skin). In step one (FIG. 1A), the solid-phase component (100), in the shape of T-blade, of a given width, height and length is 3D printed of a parent polymer material. In step two (FIG. 1B), the solid-phase component (100) is loaded into the cavity of a mold, allocated for the shape and size of the solid-phase component (100). A reinforcement (200) element (such as a glass fiber or carbon fiber reinforcement) is loaded into a cavity of a mold. In certain examples, the mold is part of a 2-pieces match mold die that fits together. This mold fit brings the solid-phase component (100) and reinforcement (200) together. In step three (FIG. 1C), liquid-phase component (300) (a resin, for example) is introduced to the closed mold, impregnates the reinforcement (200), and interacts with a face(s) of the solid-phase component (100). The liquid resin bonds with the solid-phase component (100), at given temperature, or within a temperature range. The liquid then transitions to a solid during a consolidation process. Consolidation of the solid-phase component (100) and reinforcement (200) is achieved with a controlled temperature and pressure cycle. After these steps, the resulting composite structure (400) is demolded.

Figure 2A:
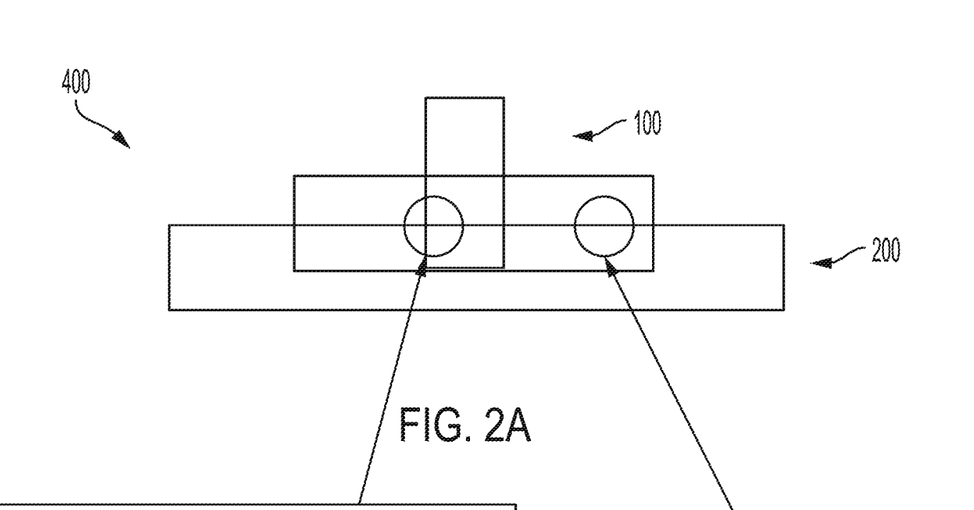
FIG. 2A shows solid-phase component surface detail that is illustrative of a design that enables mechanical interlocking with the liquid-phase component.
Figure 2B:
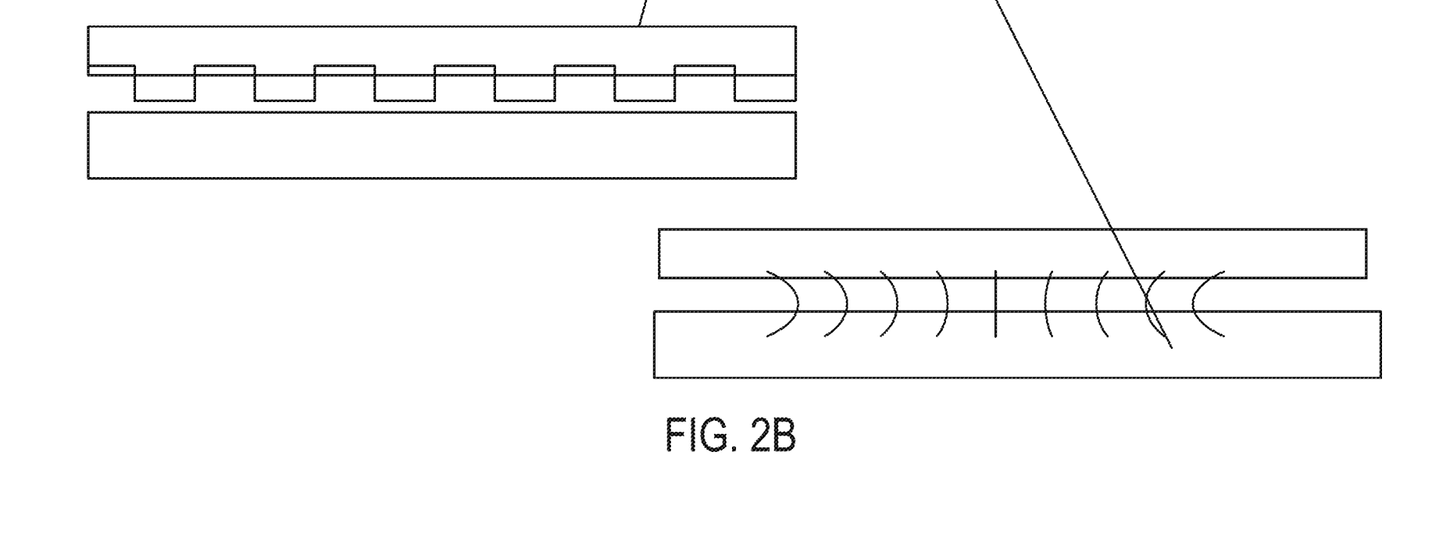
FIG. 2B illustrates the interphase between the solid-phase component and the reinforcement formed by the liquid-phase component during the infusion cure cycle.

FIG. 2A shows solid-phase component (100) surface detail that is illustrative of a design that enables mechanical interlocking with a liquid resin. Surface texture allows for resin to fill voids created by the texture and provide mechanical interlocking of the solid-phase component (100) and the reinforcement (200). Use of additive manufacturing (such as 3D printing) allows for the texture to be tailored to a desired surface, such as micro-ripples. FIG. 2B illustrates the interphase between the solid-phase component and the reinforcement formed by the liquid-phase component during the infusion cure cycle.

Figure 3:
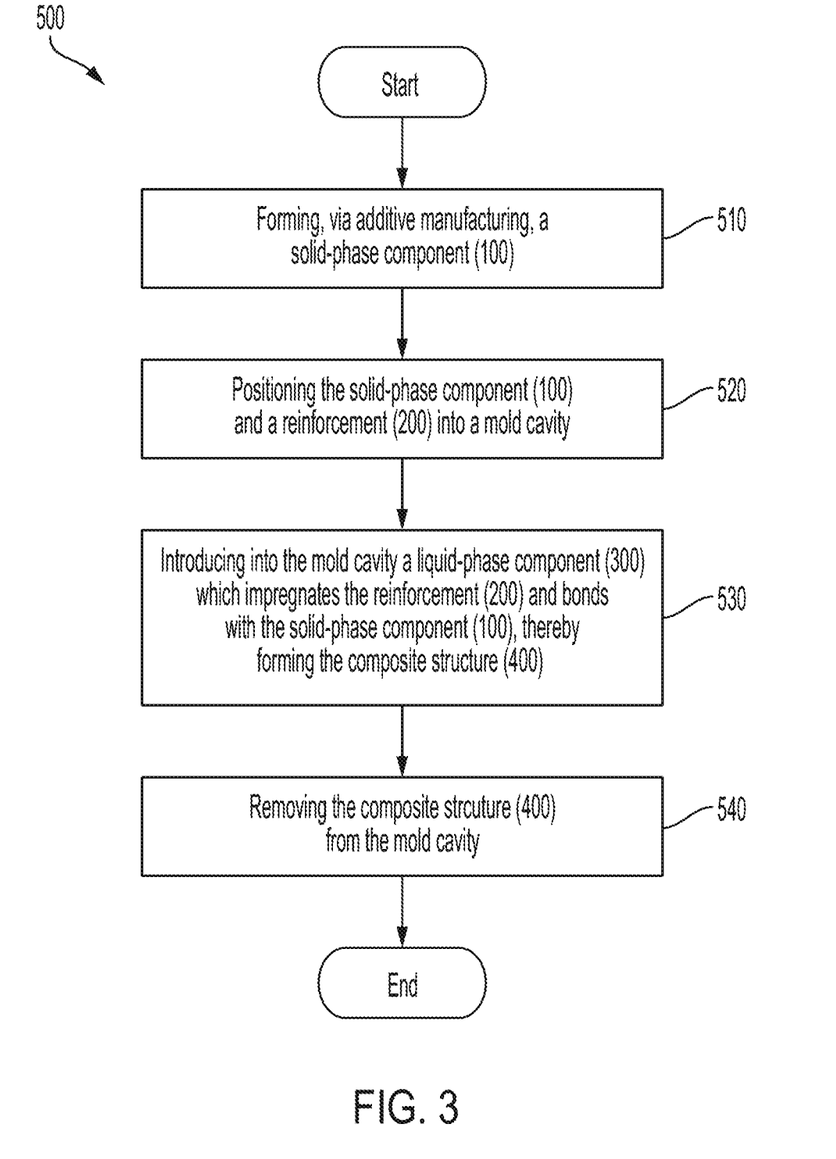
FIG. 3 is a schematic representation of an exemplary example of forming a composite structure.

FIG. 3 is a schematic representation 500 of forming a composite structure (400) comprising the steps of (i) in block 510 forming, via additive manufacturing, a solid-phase component (100); (ii) in block 520 positioning the solid-phase component (100) and a reinforcement (200) into a mold cavity; (iii) in block 530 introducing into the mold cavity a liquid-phase component (300) which impregnates the reinforcement (200) and bonds the with the solid-phase component (100), thereby forming the composite structure (400) and (iv) in block 540 removing the composite structure (400) from the mold cavity.

Figure 4:
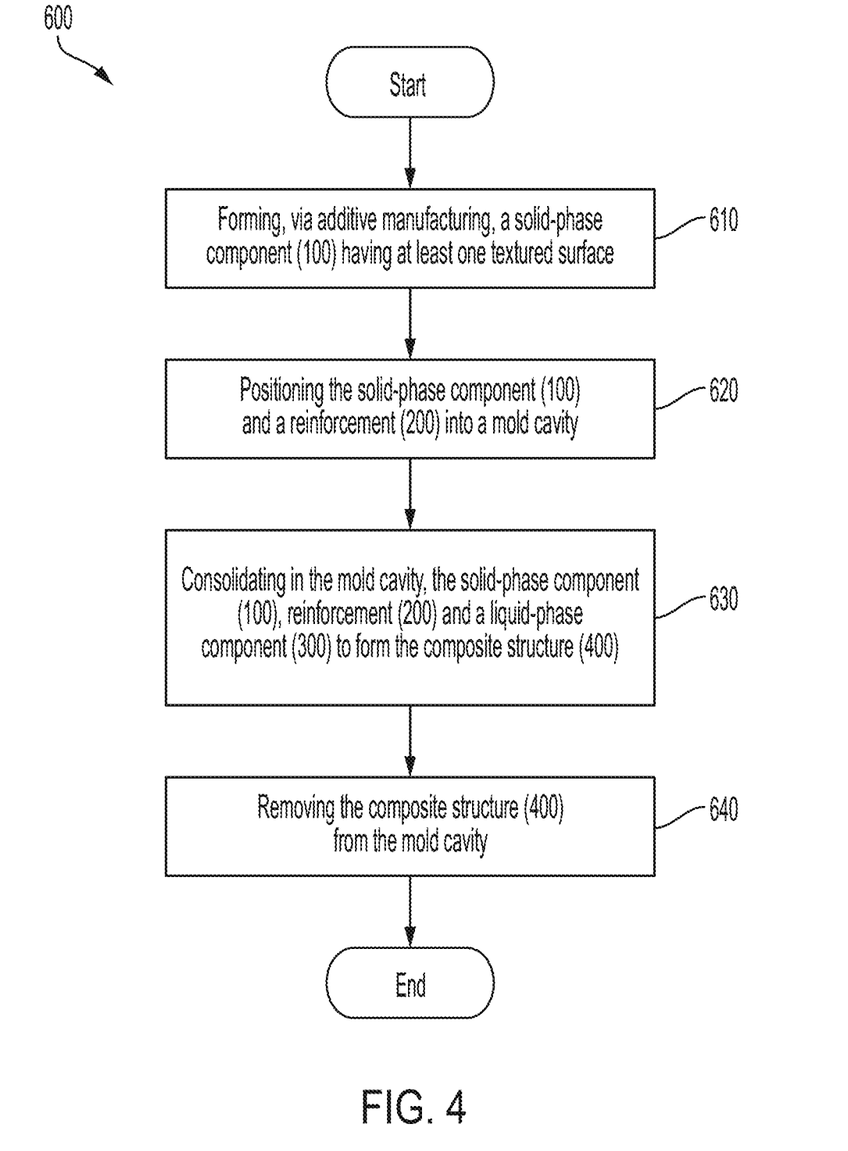
FIG. 4 is a schematic representation of an exemplary example of forming a composite structure.

FIG. 4 is a schematic representation 600 of forming a composite structure (400) comprising the steps of (i) in block 610 forming, via additive manufacturing, a solid-phase component (100) having at least one textured surface; (ii) in block 620 positioning the solid-phase component (100) and a reinforcement (200) into a mold cavity such that the textured surface of the solid-phase component (100) contacts the reinforcement (200); (iii) in block 630 consolidating in the mold cavity, the solid-phase component (100), the reinforcement (200) and a liquid-phase component (300) to solid-phase component (100) to form the composite structure (400) where the surface texture enables mechanical interlocking between components, and in block 640 removing the composite structure (400) from the mold cavity. Surface texture can be quantified by surface roughness, such as 63 micro-inch (1.6 micro-meter) Ra, and measured using a profilometer, per ISO 4288.

The achieved surface roughness is affected by material properties, layer thickness, part orientation, nozzle size, flow rate, build pattern, and STL file preparation and conversion. In some embodiments, the range for surface roughness for additive manufactured (AM) parts, that may include post processing (i.e., polishing), is in the range of 0.4 to 1.6 micro-meters roughness average (Ra) (16 to 63 micro-inch Ra) for a glossy surface, and 3.2 to 12.5 micro-meters Ra (125 to 500 micro-inches Ra) for a matte surface.

Figure 5:
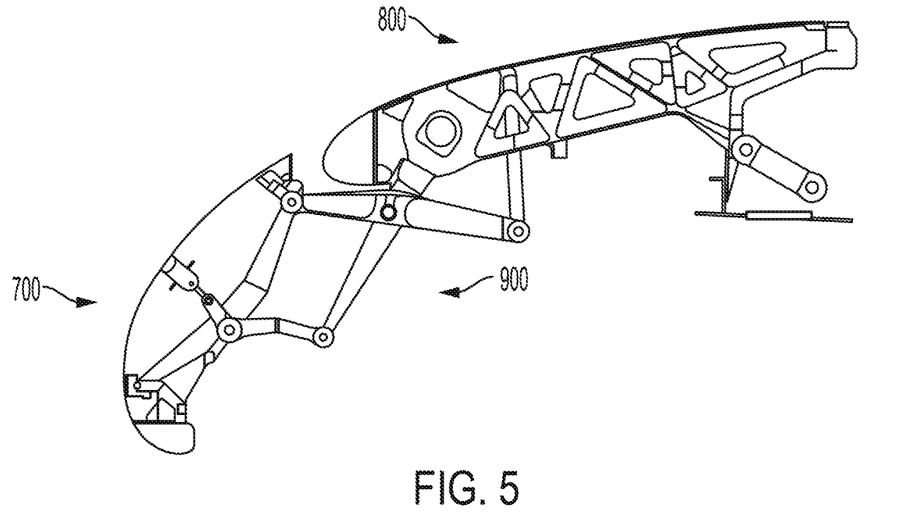
FIG. 5 shows an illustration of a leading-edge device comprising aerodynamic skins, stiffening elements and mechanisms to control part profile.

One example of a leading-edge device used in aircraft wing construction is presented in FIG. 5. The device utilizes composite panels (700 and 800) connected by a mechanism (900) that allows the positioning of the composite panels (700 and 800) to be adjusted relative to each other to control the part profile. In some examples, one or more aluminum stiffeners are utilized in the composite panels. Leading edge devices include Krueger and variable chamber flaps.

Figure 6:
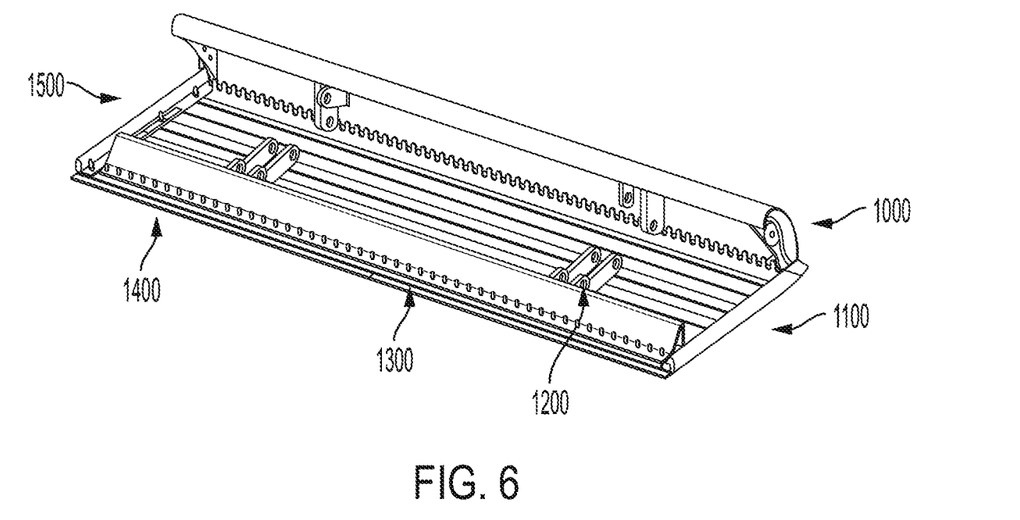
FIG. 6 presents an illustration of a structure having a bull nose part, composite panel, and an aluminum stiffener.

An exemplary leading-edge device having a composite panel (1500) having a bull nose (1000), stiffener (1300), fasteners (1400), a seal (1100) and lugs (1200) attached thereto is presented in FIG. 6. The composite panel (1500), stiffener (1300), bull nose (1000), lugs (1200), seals (1100) and mechanisms are fastened together. Typically, the bull nose (1000) comprises aluminum. The lugs (1200) and mechanisms are typically comprised of aluminum or titanium. The composite panels (1500) comprise composite fiberglass and aluminum stringer(s). The device is typically manufactured flat and then twisted by the mechanism to the needed profile.

Figure 7:
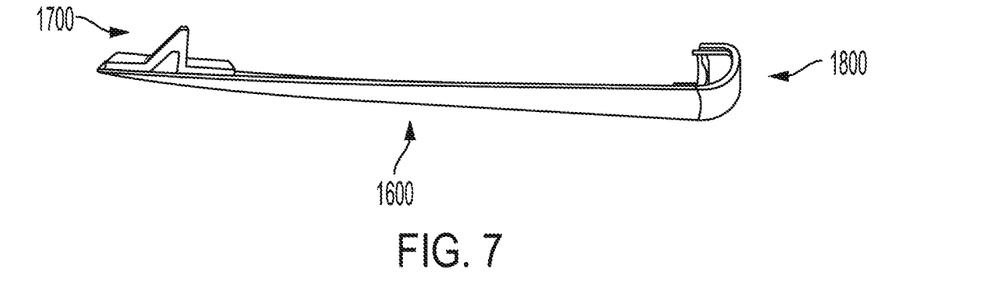
FIG. 7 is an illustration of a co-bonded resin infused composite panel having a central flex region with a bullnose and stiffener at a first end and a spanwise stiffener at a second end.
Figure 8:
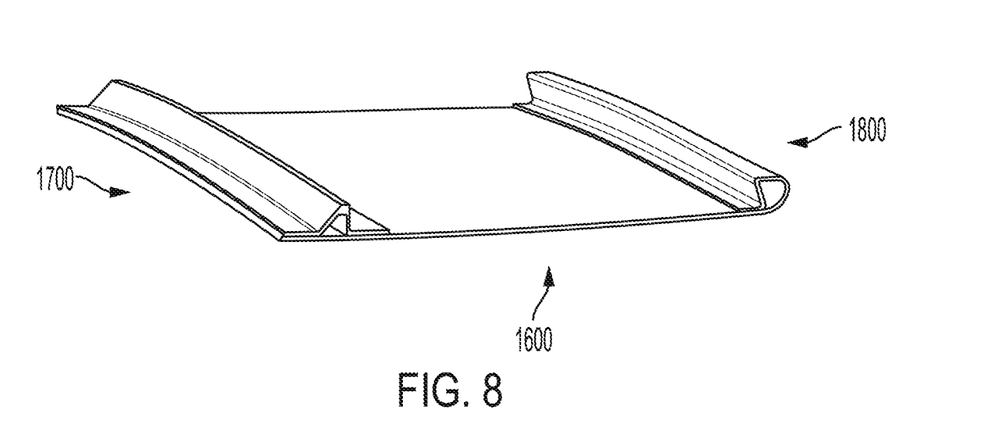
FIG. 8 presents an alternate view of the panel of FIG. 7 from a different angle.

FIGS. 7 and 8 present two views of an exemplary co-bonded resin infused composite structure with 3D printed features and details. The methods disclosed herein allow reduced part assembly costs for complex structures, such as leading-edge devices, by consolidating multiple parts during a composite curing process. In the instant figure, the stiffener (1700), resin infused composite structure (1600) and bull nose (1800) are consolidated using a resin infusion technique. The disclosed methods also reduce the need for fasteners as a separate parts.

Figure 9:
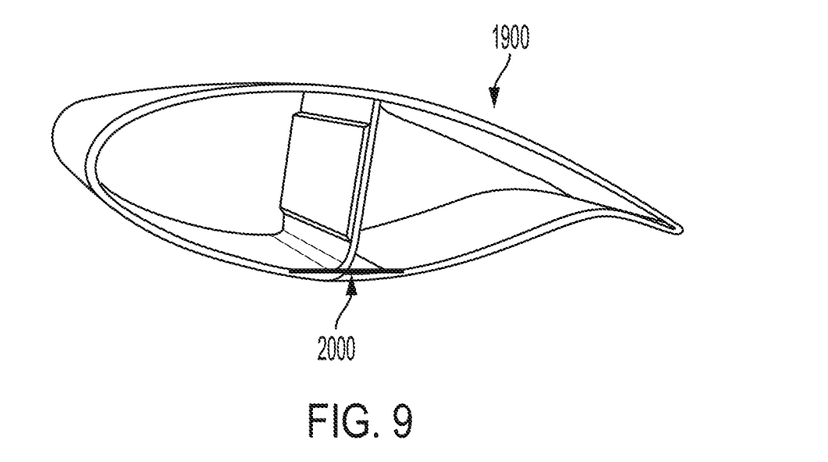
FIG. 9 shows a composite panel having a core stiffened element.

FIG. 9 illustrates a composite panel (1900) with a core stiffened element (2000). Complex aircraft parts compose multiple materials and product forms that are assembled together. The instant methods allow replacement of metallic fitting, lugs and stiffeners with 3D printed composite matrix materials. Co-bonding of polymeric based materials using resin infusion thermoset or thermoplastic liquid resin(s) allows consolidation of parts. Control of surface texture, material phase (liquid and/or solid) and chemical interaction can be optimized to improve bonding.

Figure 10A:
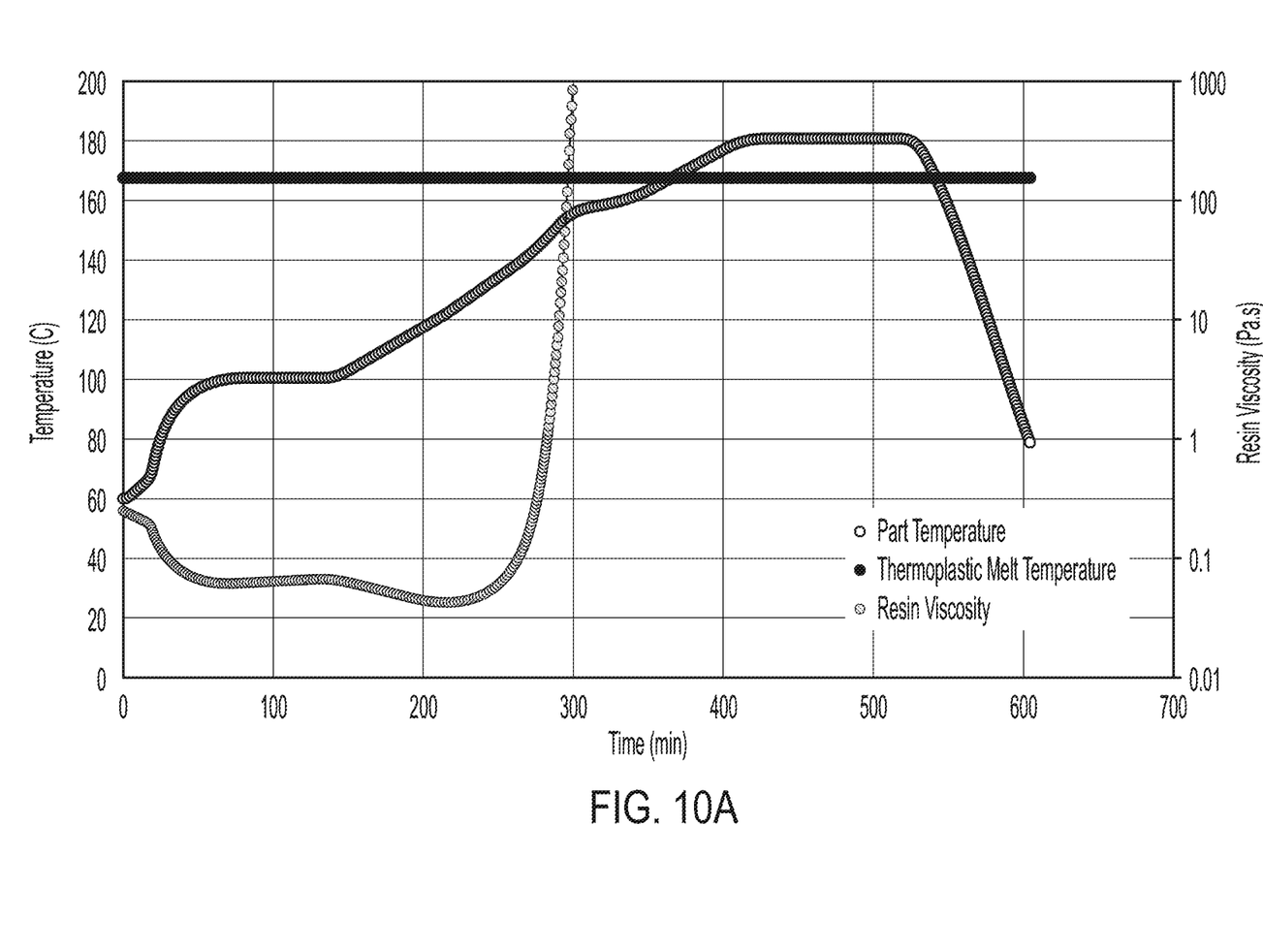
FIGS. 10A-10D show temperature-time plots during the infusion and cure steps.

FIG. 10A shows an example of a temperature-time plot during infusion the liquid-phase component (300), that is an epoxy resin, and the cure of the composite structure (400). In this case when the preform is at a temperature of 100° C., the viscosity of the resin is less than 0.1 Pa·s. This viscosity is sufficient to allow successful infusion into the reinforcement (200) within an allocated time period. The resin viscosity is also sufficient to wet (or coat) the 3D printed detail.

Figure 10B:
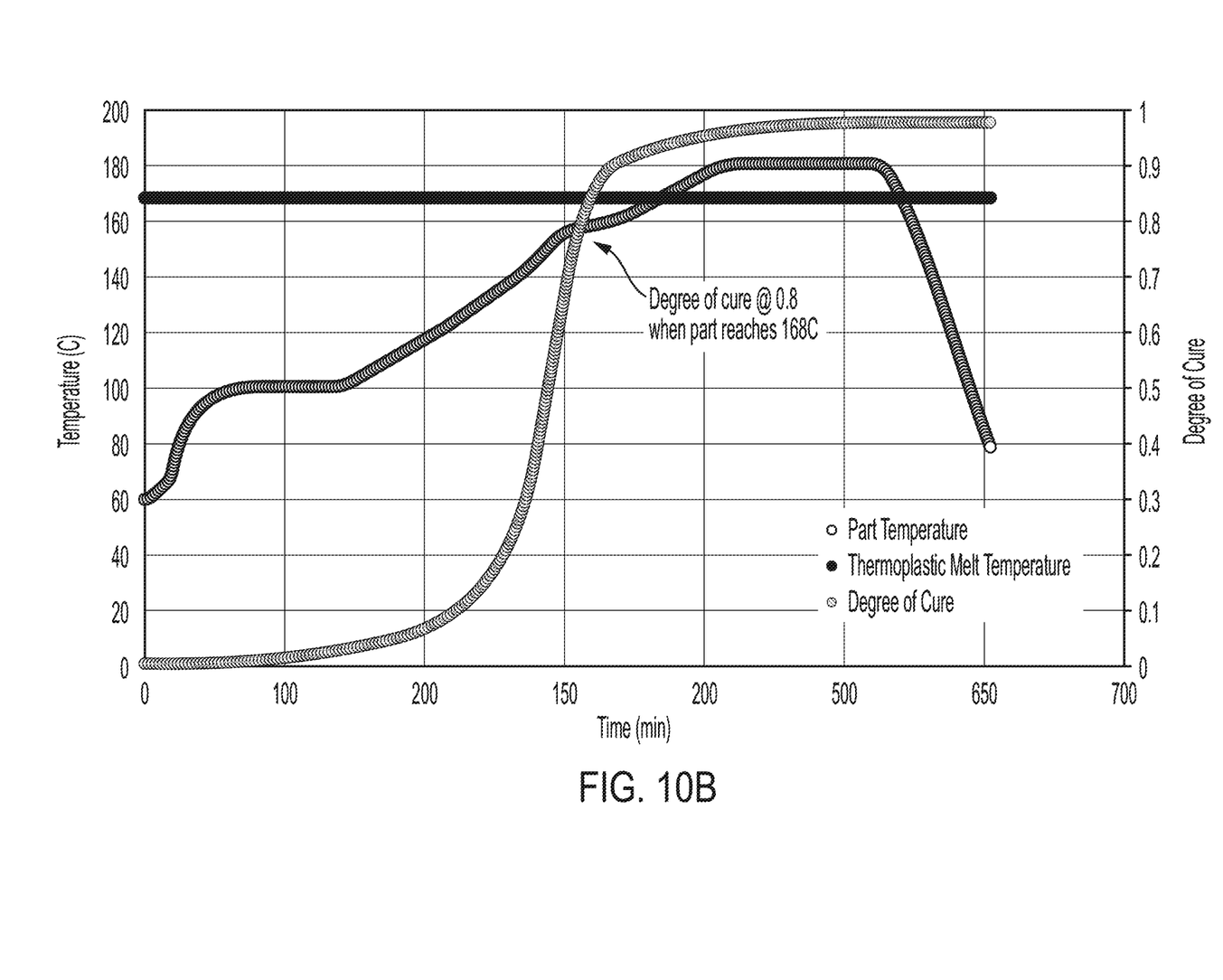

As shown in FIG. 10B, during the ramp from infusion to cure stage, the degree of cure of the resin accelerates. The cure temperature, in this case, is set at 180° C. The degree of cure of the resin is 0.8, when the composite structure (400) reaches 168° C., that is the melting temperature of the Nylon 12 insert. The viscosity at this temperature is above 100 Pa·s, hence the Nylon 12 insert remains rigid and in the configured form to ensure successful consolidation with the curing epoxy resin, as it approaches the cure temperature of 180° C. But also, there is still a potential liquid to liquid interaction between the epoxy resin and nylon thermoplastic AM insert to enable a strong chemical bond.

Figure 10C:
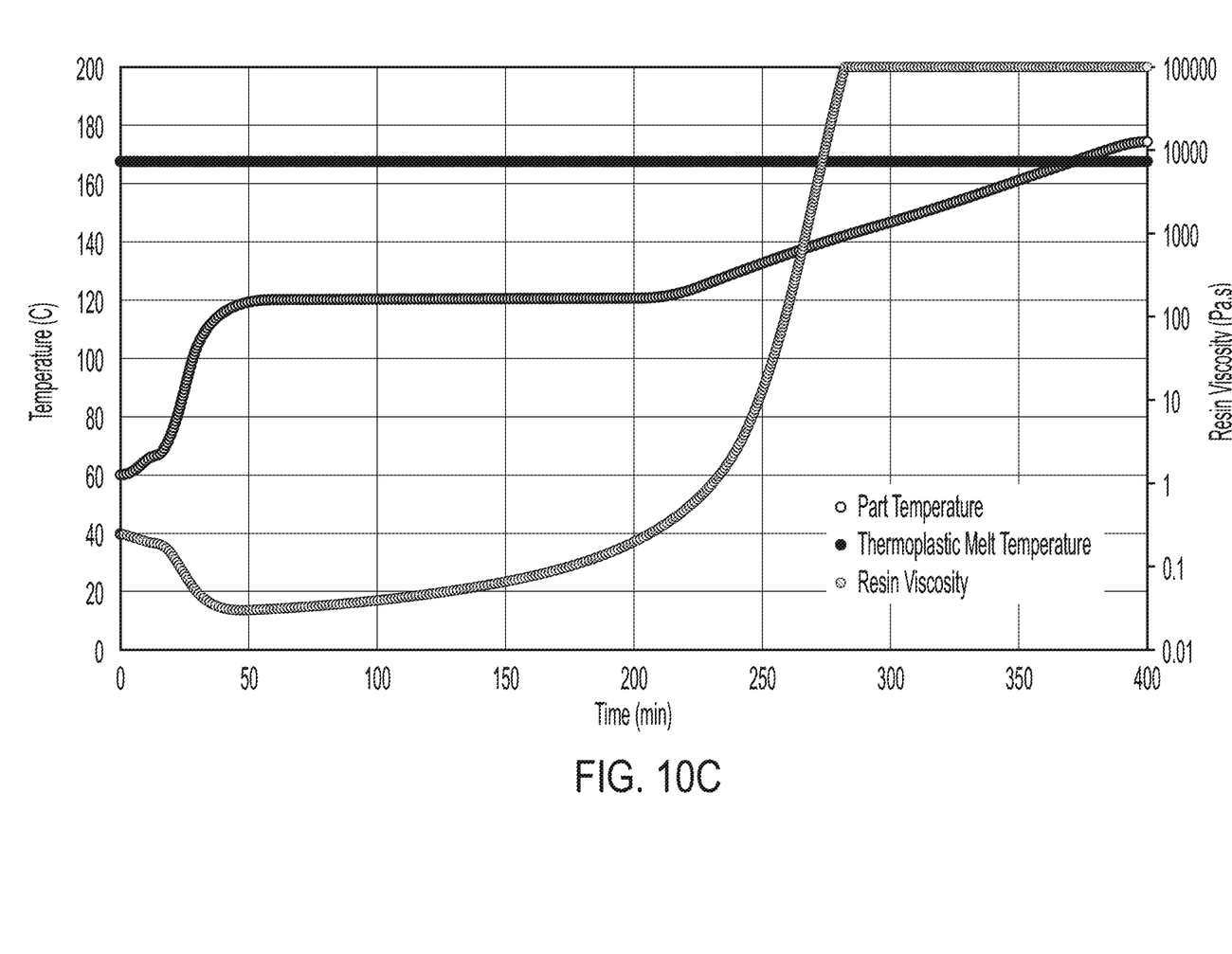
Figure 10D:
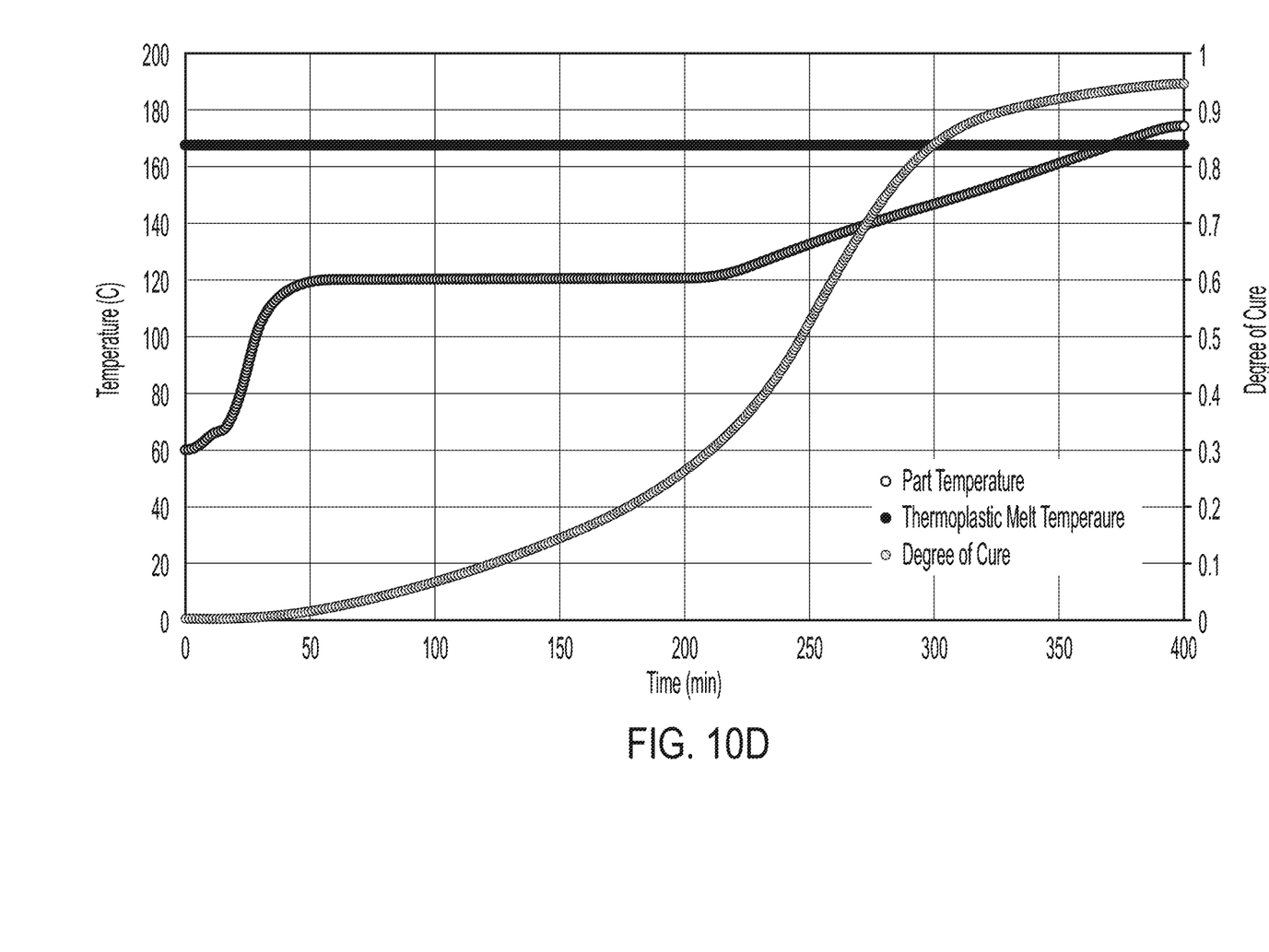

FIG. 10C shows an example of infusion of epoxy resin into a carbon preform with a Nylon 12 AM insert where the resin viscosity is <100,000 Pa·s, when the infused preform and AM insert temperature reaches 168° C., the melt temperature of the Nylon 12. FIG. 10D shows an example, for the same temp-time plot, where the degree of cure is 0.94 when the infused preform and AM insert reaches 168° C. In this case, the epoxy resin is reliant on mechanical interlocking to form a strong bond with the AM insert, as the thermoplastic AM was fully solid as the epoxy resin transitioned from liquid to solid.

In some embodiments, an effective bond can be achieved below 0.85 degree of cure. From experience working with high viscous resin systems, such as found in prepreg, a viscosity of around 10 Pa·s should be sufficient to prevent change in shape of the AM insert during processing.

Figure 11:
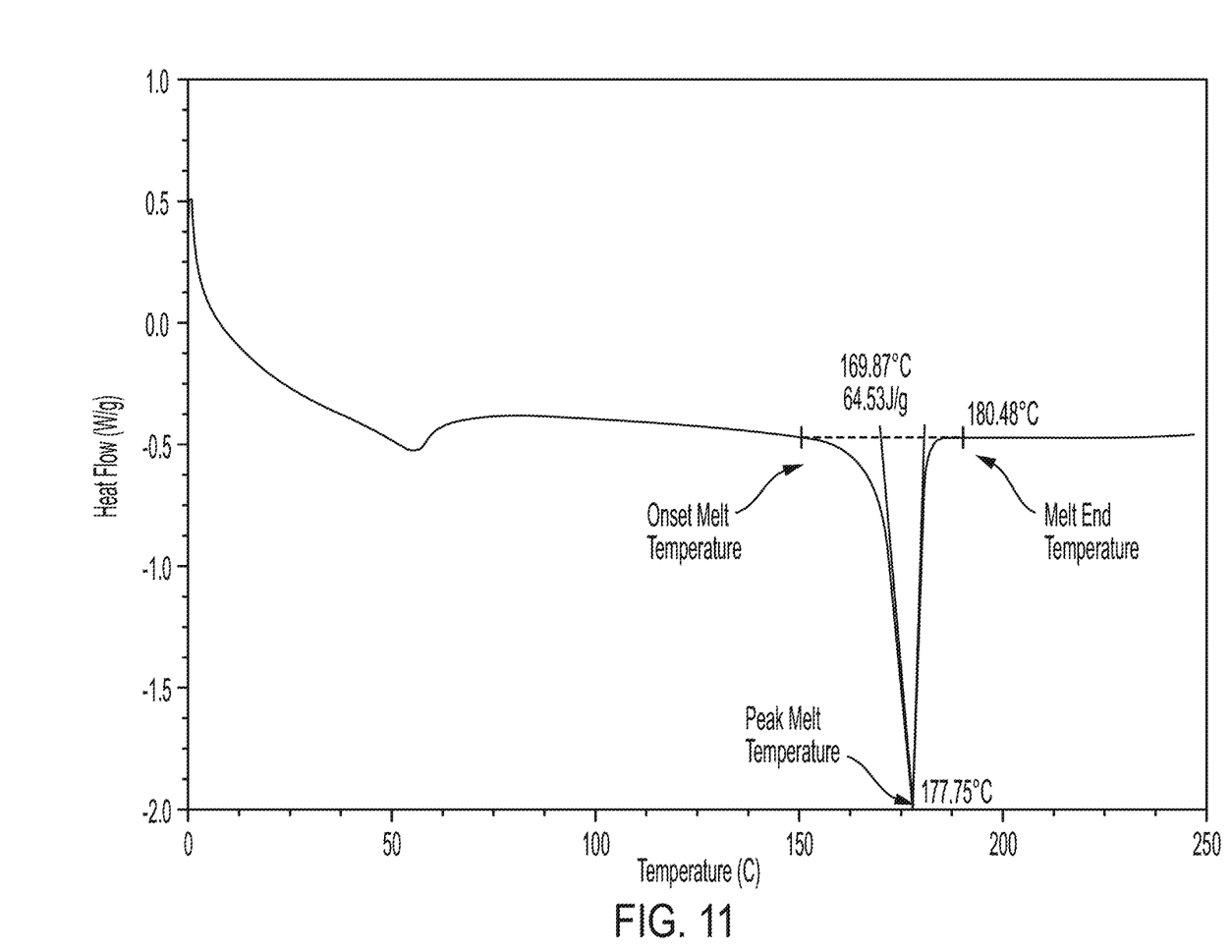
FIG. 11 presents a differential scanning calorimetry (DSC) plot for Nylon 12.

The physical state of the 3D printed material, as a function of the viscosity and degree of cure, is important for an effective bond. The physical state of the 3D printed materials can be evaluated based on differential scanning calorimetry (DSC) or thermomechanical analysis (TMA) plots. In the case for Nylon 12, the physical state changes, or transitions from solid to liquid from 160° C. to 180° C., as shown in FIG. 11. In this example, when the degree of cure exceeds 0.90, when the Nylon 12 temperature is less than 160° C., bonding is believed to be reliant on mechanical interlocking based on the texturized surface. If the degree of cure is less than 0.90, when the nylon temperature reaches 160° C., it is believed that intermolecular forces are a key factor in bonding. If the degree of cure is less than 0.90, when the nylon temperature exceeds 180° C., then a change in the shape or profile of the 3D printed Nylon 12 may occur, that then changes the effective design, shape, or profile of the part.

Changes in temperature cause materials to expand or contract. Typically, materials expand when heated and contract when cooled. Control of 3D printed material properties, such as the coefficient of thermal expansion can be utilized to enable effective bond and prevention of thermally induced cracking. Choice of materials is one factor in producing suitable solid-phase components (100).

In certain embodiments, the composite material system, as a laminate when combining liquid thermoset or thermoplastic resin with carbon fiber reinforcements, will have a modulus in range from 5 to 35 megapounds per square inch (msi), un-notched strength of 50 to 300 kilopound per square inch (ksi), and 0.5 to 10 (in-lb/in$^2$) interlaminar fracture toughness. The solid additive manufactured part, or insert, of thermoplastic (with or without fillers) will have a modulus in range from 0.1 to 2 msi, and un-notched strength of 0.4 to 25 ksi.

Further, the disclosure comprises additional notes and examples as detailed in the following clauses set forth below.

Clause 1. A method for fabricating a composite structure, said method comprising:
    forming, via additive manufacturing, a solid-phase component comprising a polymer matrix material;
    positioning the solid-phase component and a reinforcement into a mold cavity; and
    introducing into the mold cavity a liquid-phase component comprising a material that is bond-compatible with the polymer matrix material, such that the liquid-phase component impregnates the reinforcement and bonds with the solid-phase component thereby forming the composite structure.

Clause 2. The method according to clause 1, wherein introducing the liquid-phase component into the mold cavity comprises injection molding or resin infusion.

Clause 3. The method according to clause 1 or clause 2, wherein the solid-phase component bonds with the liquid-phase component at a predetermined temperature of about 60° C. to about 160° C.

Clause 4. The method according to any one of clauses 1-3, wherein the solid-phase component comprises a thermoplastic material.

Clause 5. The method according to any one of clauses 1-4, wherein the liquid-phase component comprises a thermoset resin, a thermoplastic resin, or mixtures thereof.

Clause 6. The method according to any one of clauses 1-5, wherein the solid-phase component comprises polyethylene terephthalate, polypropylene, polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), polyethylenimine (PEI), polyphenylene sulfide (PPS), polyethersulfone (PES), polyvinyl chloride (PVC), polypropylene (PP), and high-density polyethylene (HDPE).

Clause 7. The method according to any one of clauses 1-6, wherein the reinforcement comprises one or more of glass fibers and carbon fibers.

Clause 8. The method according to any one of clauses 1-7, wherein the liquid-phase component comprises polyethylene terephthalate, polypropylene, polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), Polyethylenimine (PEI), polyphenylene sulfide (PPS), polyethersulfone (PES), polyvinyl Chloride (PVC), polypropylene (PP), and high-density polyethylene (HDPE).

Clause 9. The method according to any one of clauses 1-8, wherein the viscosity of the liquid-phase component is about 0.01 Pa·s to about 1.0 Pa·s as determined by according to ASTM D 2196.

Clause 10. The method according to any one of clauses 1-9, wherein the reinforcement comprises a glass fiber reinforcement.

Clause 11. The method according to anyone of clauses 1-9, wherein the reinforcement comprises a carbon fiber reinforcement.

Clause 12. The method according to any one of clauses 1-11, wherein when forming during additive manufacturing of the solid-phase component, rasp angle and bead thickness are controlled to mitigate voids, stress concentrations, and thermal mismatch.

Clause 13. The method according to any one of clauses 1-12, wherein voids or porosity in the composite structure are less than 5% by volume.

Clause 14. The method according to any one of clauses 1-13, wherein stress concentrations in the composite structure are less than 0.25-inches in length.

Clause 15. The method according to any one of clauses 1-14, wherein the solid-phase component has a textured surface.

Clause 16. The method according to any one of clauses 1-15, wherein the composite structure is a skin or a stiffener.

Clause 17. The method according to any one of claims 1-16, wherein the composite structure is removed from the mold cavity.

Clause 18. A method for fabricating a composite structure, said method comprising:
  forming, via additive manufacturing, a solid-phase component;
  positioning the solid-phase component and a reinforcement into a mold cavity; and
  consolidating, in the mold cavity under a controlled temperature and a controlled pressure, the solid-phase component, the reinforcement, and a liquid-phase component that is bond-compatible with the solid-phase component to form the composite structure.

Clause 19. The method according to clause 18, wherein consolidating the solid-phase component, reinforcement and the liquid-phase into the mold cavity comprises resin infusion.

Clause 20. The method according to clause 18 or clause 19, wherein the solid-phase component bonds with the liquid-phase component at a predetermined temperature of about 60° C. to about 160° C.

Clause 21. The method according to any one of clauses 18-20, wherein the solid-phase component and the liquid-phase component comprise a polymeric-based material.

Clause 22. The method according to any one of clauses 18-21, wherein the solid-phase component comprises a thermoplastic material.

Clause 23. The method according to any one of clauses 18-21 wherein the liquid-phase component comprises a thermoset resin, a thermoplastic resin, or mixtures thereof.

Clause 24. The method according to any one of clauses 18-23, wherein the solid-phase component comprises polyethylene terephthalate, polypropylene, polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), Polyethylenimine (PEI), polyphenylene sulfide (PPS), polyethersulfone (PES), polyvinyl Chloride (PVC), polypropylene (PP), and high-density polyethylene (HDPE).

Clause 25. The method according to any one of clauses 18-24, wherein the reinforcement comprises one or more of glass fibers and carbon fibers.

Clause 26. The method according to any one of clauses 18-25, wherein the liquid-phase component comprises polyethylene terephthalate, polypropylene, polycarbonate (PC), polybutylene terephthalate, vinyl, polyethylene, polyetherimide, polyetherketone (PEK), polyetheretherketone (PEEK), polyetherketoneketone (PEKK), polyaryletherketone (PAEK), polyamide (PA), Polyethylenimine (PEI), polyphenylene sulfide (PPS), polyethersulfone (PES), polyvinyl Chloride (PVC), polypropylene (PP), and high-density polyethylene (HDPE).

Clause 27. The method according to any one of clauses 18-26, wherein the reinforcement comprises a glass fiber reinforcement.

Clause 28. The method according to any one of clauses 18-27, wherein the reinforcement comprises a carbon fiber reinforcement.

Clause 29. The method according to any one of clauses 18-28, wherein forming during the additive manufacturing of the solid-phase component, rasp angle and bead thickness are controlled to mitigate voids, stress concentrations, and thermal mismatch.

Clause 30. The method according to any one of clauses 18-29, wherein voids or porosity are less than 5% by volume.

Clause 31. The method according to any one of clauses 18-30, wherein stress concentrations are less than 0.25-inches in length.

Clause 32. The method according to any one of clauses 18-31, wherein the solid-phase component has a textured surface.

Clause 33. The method according to any one of clauses 18-32, wherein the composite structure is a stiffener.

Clause 34. The method according to any one of claims 18-33, wherein the composite structure is removed from the mold cavity.

Clause 35. An airplane aircraft wing flap having a leading edge, said leading edge comprising the composite structure formed by the method in accordance with any one of clauses 1-17.

Clause 36. An airplane aircraft wing flap having a leading edge, said leading edge comprising the composite structure formed by the method in accordance with any one of clauses 18-34.

What is claimed:

1. A method for fabricating a composite structure, said method comprising:
    forming, via additive manufacturing, a solid-phase component comprising a polymer matrix material;
    positioning the solid-phase component and a reinforcement into a mold cavity; and
    introducing into the mold cavity a liquid-phase component comprising a material that is bond-compatible with the polymer matrix material, such that the liquid-phase component impregnates the reinforcement and bonds with the solid-phase component thereby forming the composite structure;
    wherein the solid-phase component has a surface texture enabling mechanical interlocking with the liquid-phase component.

2. The method according to claim 1, wherein introducing the liquid-phase component into the mold cavity comprises injection molding or resin infusion.

3. The method according to claim 1, wherein the solid-phase component bonds with the liquid-phase component at a predetermined temperature of about 60° C. to about 160° C.

4. The method according to claim 1, wherein the solid-phase component comprises a thermoplastic material.

5. The method according to claim 1, wherein the liquid-phase component comprises a thermoset resin, a thermoplastic resin, or mixtures thereof.

6. The method according to claim 1, wherein viscosity of the liquid-phase component is about 10-cps to about 1000-cps as determined by ASTM D 2196.

7. The method according to claim 1, wherein the reinforcement comprises one or both of glass fiber reinforcement and carbon fiber reinforcement.

8. The method according to claim 1, wherein the composite structure is removed from the mold cavity.

9. The method according to claim 1, wherein the solid-phase component has a textured surface.

10. The method according to claim 1, wherein the composite structure is a skin or a stiffener.

11. A method for fabricating a composite structure, said method comprising:
    forming, via additive manufacturing, a solid-phase component;
    positioning the solid-phase component and a reinforcement into a mold cavity; and
    consolidating, in the mold cavity under a controlled temperature and a controlled pressure, the solid-phase component, the reinforcement, and a liquid-phase component that is bond-compatible with the solid-phase component to form the composite structure;
    wherein the solid-phase component has a surface texture enabling mechanical interlocking with the liquid-phase component.

12. The method according to claim 11, wherein consolidating the solid-phase component, reinforcement and the liquid-phase component into the mold cavity comprises resin infusion.

13. The method according to claim 11, wherein the solid-phase component bonds with the liquid-phase component at a predetermined temperature of about 60° C. to about 160° C.

14. The method according to claim 11, wherein the solid-phase component and the liquid-phase component comprise a polymeric-based material.

15. The method according to claim 14, wherein the solid-phase component comprises a thermoplastic material.

16. The method according to claim 14, wherein the liquid-phase component comprises a thermoset resin, a thermoplastic resin, or mixtures thereof.

17. The method according to claim 11, wherein the reinforcement comprises one or both of glass fiber reinforcement and carbon fiber reinforcement.

18. The method according to claim 11, wherein the composite structure is removed from the mold cavity.

19. The method according to claim 11, wherein forming during the additive manufacturing of the solid-phase component, rasp angle and bead thickness are controlled to mitigate voids, stress concentrations, and thermal mismatch.

* * * * *